(No Model.)
H. R. ALLEN.
CAN TOP.
No. 297,738. Patented Apr. 29, 1884.
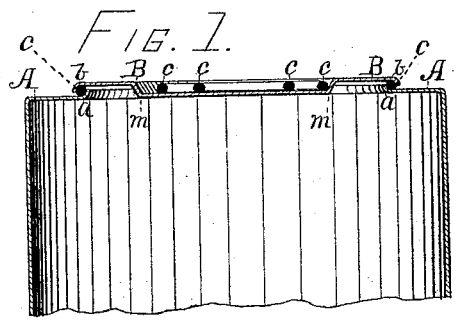
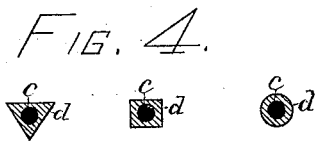
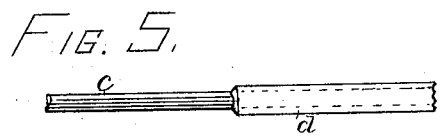
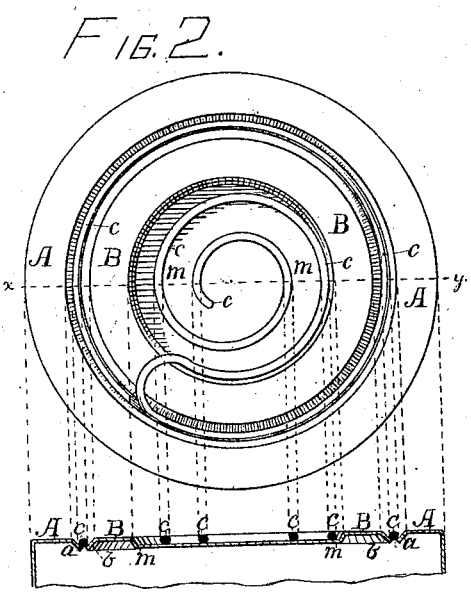
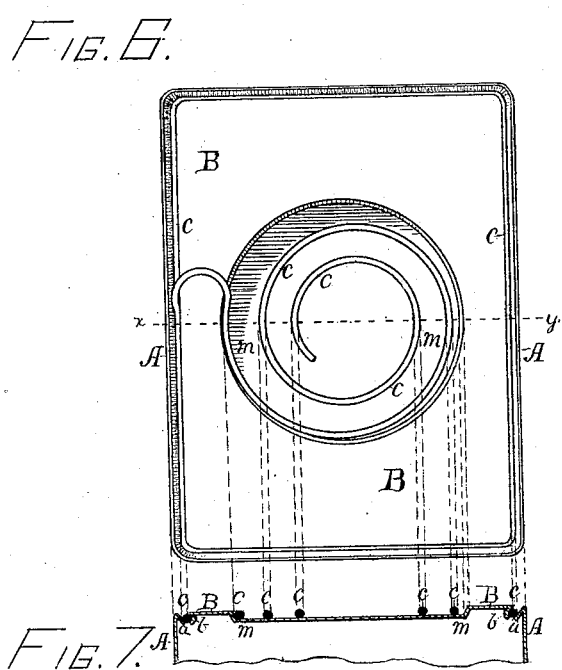
WITNESSES:
Wm. A. Van Buren
Samuel A. Minturn
INVENTOR:
Horace R. Allen
per Minturn & Minturn
Attorneys

UNITED STATES PATENT OFFICE.

HORACE R. ALLEN, OF INDIANAPOLIS, INDIANA.

CAN-TOP.

SPECIFICATION forming part of Letters Patent No. 297,738, dated April 29, 1884.

Application filed July 7, 1883. (No model.)

*To all whom it may concern:*

Be it known that I, HORACE R. ALLEN, a citizen of the United States, residing at Indianapolis, in the county of Marion and State of Indiana, have invented a new and useful Can-Top, of which the following is a specification.

My invention relates to improvements in the tops of tin cans in which a wire is soldered in the seam between the body of the can and the top, or in the seam at the junction of the can-top with its lid; and the object of my improvement is to provide a ready means of opening a sealed can without the use of an instrument and without cutting the tin. I attain this object by the construction illustrated in the accompanying drawings, in which—

Figure 1 is a vertical section of the upper part of a can, showing one method of arranging the wire in the seam to be soldered; Fig. 2, a top view of the can, showing the manner in which one end of the wire which is left long enough to be firmly grasped by the hand is coiled and placed in a circular depression in the middle of the can-top, where it will be out of the way. Fig. 3 is a vertical section of same through the line $x\,y$, and shows a second mode of applying the wire. Fig. 4 shows various sections of the wire, and illustrates the wire encircled with solder enough to seal the can before it is placed in the seam. Fig. 5 shows the wire with the solder melted off of the end that is to be coiled and used as a handle. Fig. 6 is the wire applied in securing the top on a sardine or any rectangular or square shaped can. Fig. 7 is a cross-section of same through line $x\,y$, and shows a third mode of applying the wire.

Similar letters refer to similar parts throughout the several views.

In Fig. 1 the tin A A is bent up into a flange, $a\,a$, around the central opening. The lid B B is flanged downward in a corresponding manner, as shown at $b\,b$. The wire $c$, which has been previously enveloped in a coating of soft solder, as shown in section in Fig. 4, ($c\,c\,c$ being the wire and $d\,d\,d$ the solder,) is placed between the flanged edges $a\,b$. The two pieces of tin may now be readily soldered together by passing a heated iron around the edge $b$. One end of the wire is soldered securely between $a$ and $b$; but the other end, after it has made a complete circuit, is passed outside and allowed to project sufficiently to be grasped firmly by the hand. This projecting end, from which the solder has been melted, as at $c$, Fig. 5, is then neatly coiled and bent over into a depression, $m\,m$, made in the lid to receive it.

It will be noticed that the can A and lid B do not touch, and that the connection is made by the wire $c$ and the solder, and when the wire is removed, as is easily done by pulling on the coiled end, the lid will be detached. Another mode of shaping the edges and adjusting the wire so as to accomplish the same result is shown in Figs. 2 and 3, and a third mode is shown in Figs. 6 and 7.

I use any soft solder that will allow the wire to be easily withdrawn, and to prevent any possibility of the top or lid B becoming soldered to the flange $a$ inside of the wire $c$ the parts may be by covered with a varnish or coating of any mixture that will keep the solder from adhering to the tin and from uniting the two pieces back of the wire $c$. This coating is most conveniently applied by dipping the parts in a bath of the varnish or mixture, and wherever it is desired that the solder should adhere to the metal plates the varnish resist is scraped off or otherwise removed.

In the manufacture and use of the can-top it can be furnished with the solder-covered wire in position, so that all that will be necessary after the can is filled will be to place the top in position and pass the heated iron around the edge.

The solder enveloping the wire may be of any convenient form, as shown by the sections in Fig. 4. After the solder is on the wire, the latter is cut into convenient lengths and the solder melted from the end to be coiled for the handle.

Having thus fully described my invention, what I claim as new, and wish to secure by Letters Patent, is—

1. As an article of manufacture, a wire covered with solder capable of use for soldering joints in metallic vessels, substantially as described and specified.

2. As an article of manufacture, a wire covered with solder having a shape in cross-section corresponding to that of the parts adjacent to the seam to be soldered, and capable of use for soldering joints in metallic vessels, as set forth.

3. As an article of manufacture, a wire covered with solder, a portion of the wire being bare of solder and to be used for soldering joints in metallic vessels, as described and specified.

4. For soldering and opening joints in metallic vessels on the metallic sheets to be soldered, a coating of any mixture that will act as a resist and keep the solder from adhering to the plates at all points except when the coating has been purposely removed, in combination with a solder-covered wire, substantially as described, and for the purposes specified.

HORACE R. ALLEN.

Witnesses:
L. E. MILLER,
S. I. DAVISON.